United States Patent
Maliszewski

[11] Patent Number: 5,974,550
[45] Date of Patent: Oct. 26, 1999

[54] METHOD FOR STRONGLY AUTHENTICATING ANOTHER PROCESS IN A DIFFERENT ADDRESS SPACE

[75] Inventor: Richard L. Maliszewski, Forest Grove, Oreg.

[73] Assignee: Intel Corporation, Santa Clara, Calif.

[21] Appl. No.: 08/989,615

[22] Filed: Dec. 12, 1997

[51] Int. Cl.$^6$ ............................ H04L 9/00; H04K 1/00
[52] U.S. Cl. .................... 713/200; 713/201; 713/202
[58] Field of Search .................... 713/200, 201, 713/202; 380/3, 4, 21, 23, 24, 25

[56] References Cited

U.S. PATENT DOCUMENTS

| | | | |
|---|---|---|---|
| 4,521,846 | 6/1985 | Scalzi et al. | 711/209 |
| 4,811,393 | 3/1989 | Hazard | 380/21 |
| 4,964,163 | 10/1990 | Berry | 380/23 |
| 5,311,594 | 5/1994 | Penzias | 380/23 |

*Primary Examiner*—Ly V. Hua
*Attorney, Agent, or Firm*—Steven P. Skabrat

[57] ABSTRACT

Authenticating a remote process operating in an address space different than that of a local process includes the steps of creating, by the local process, a tamper resistant module containing a temporary secret, sending the tamper resistant module and a challenge from the local process to the remote process, executing the tamper resistant module by the remote process and recovering the secret when the integrity of the remote process is verified by the tamper resistant module, encoding the challenge using the secret to produce a response, sending the response to the local process, and decoding the response by the local process. Optionally, the tamper resistant module includes a request for information from the second process and the response includes the answer to the request for information.

23 Claims, 3 Drawing Sheets

METHOD FOR STRONGLY AUTHENTICATING ANOTHER PROCESS IN A DIFFERENT ADDRESS SPACE

BACKGROUND OF THE INVENTION

1. Field of the Invention

The present invention relates generally to remote security protocols in computer systems and more specifically to a challenge-response protocol for ensuring the authenticity of a process operating in a different address space.

2. Description of Related Art

Current methods of performing challenge-response protocols in a cryptographic system require the parties or processes performing the protocol to share a high-value persistent secret or both parties must process appropriate pieces of two asymmetric key pairs. In both of these scenarios, prior communication of the secrets between the parties or knowledge of the public component of the other party's key pair is required. Most versions of such challenge-response protocols are vulnerable to "man-in-the-middle" attacks, which are particularly problematic if the two parties are communicating over a network. Hence, general challenge-response protocols prove only that a verified channel between two endpoints sharing a secret has been set up, but one of the endpoints could be insecure. It would be better if one party could authenticate the other party to ensure that the other party has not be tampered with or "hacked", as opposed to just validating that the other party shares the secret. This can be done when the parties share the same address space by checking the contents of memory of the other party, computing its digital signature, and verifying its integrity. However, this cannot be accomplished across different process address spaces unless the memory is shared. Various challenge-response protocols and their deficiencies are described in "Applied Cryptography", by Bruce Schneier, second edition, 1996. What is needed is a protocol that overcomes the above problems and deficiencies of the prior art by securely communicating a required secret as part of an authentication process such that the secret can be a nonce of no persistent worth and wherein the secret need not be previously communicated.

SUMMARY OF THE INVENTION

An embodiment of the present invention is a method for authenticating a first process operating in an address space different than that of a second process. The method includes the steps of creating, by the second process, a module containing a secret, sending the module and a challenge from the second process to the first process, executing the module by the first process and recovering the secret when the integrity of the first process is verified by the module, encoding the challenge using the secret to produce a response, sending the response to the second process, and decoding the response by the second process.

BRIEF DESCRIPTION OF THE DRAWINGS

The features and advantages of the present invention will become apparent from the following detailed description of the present invention in which.

DETAILED DESCRIPTION OF THE PRESENT INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
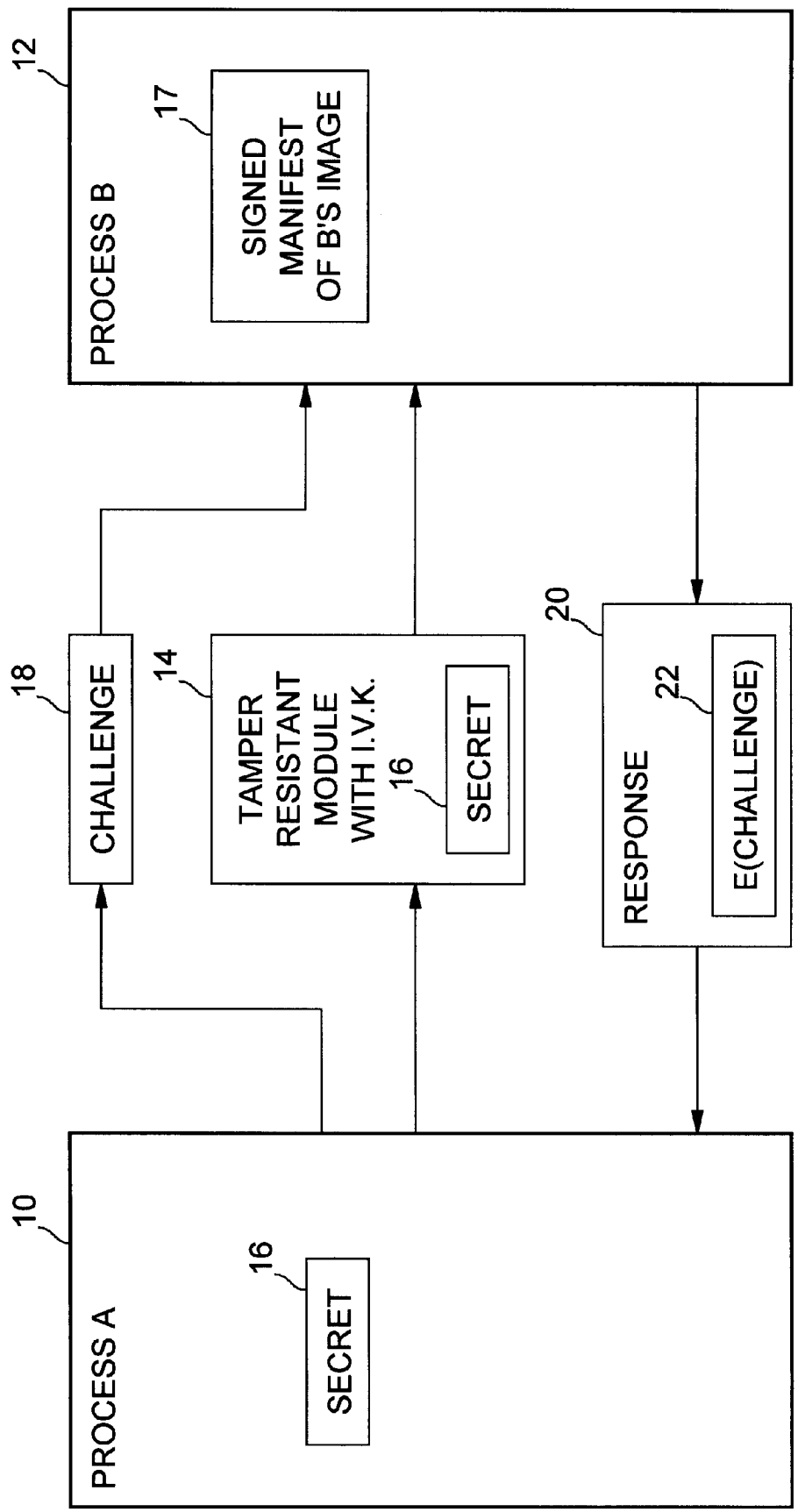
FIG. 1 is a diagram of two processes communicating with each other in a secure manner according to the present invention.

FIG. 1 is a diagram of two processes communicating with each other in a secure manner according to the present invention. FIG. 1 shows two processes, Process A 10 and Process B 12. These processes do not share an address space and may or may not exist on the same processor or computer system. Typically, the processes will be parties to a transaction such as for electronic commerce, wherein Process B 12 asks Process A 10 for a service to be performed. An example of such a service is a consumer purchase, although any transaction desired to be secure involving two parties connected by a network is contemplated. Before Process A fulfills Process B's request for service, Process A seeks to establish the authenticity and verify the integrity of Process B. Authenticity means that the entity purporting to be Process B is actually Process B and not a fraudulent "man in the middle" attacker. Integrity verification means that Process B has not been altered or "hacked" in any way. In an embodiment of the present invention, Process A creates a tamper resistant module 14 that is capable of verifying the integrity of Process B. The tamper resistant module is a small piece of executable software that can be easily communicated from one process to another and executed by a receiving system. Process A creates a temporary secret, passes it in the tamper resistant module to Process B such that the tamper resistant module will only reveal the secret if Process B's credentials and actual image in memory agree. Process B's credentials may be sent along with the tamper resistant module if Process A learns of Process B's credentials beforehand, or they may be examined at Process B's system by the tamper resistant module (i.e., the location of the credentials on process B's system could be passed as an argument to the tamper resistant module before it is executed). The credentials typically will be a predetermined signed manifest of Process B's code image.

Tamper resistant software is software which is resistant to observation and modification. It can be trusted, within certain bounds, to operate as intended even in the presence of a malicious attack. Tamper resistant software must be position independent and not require relocation in memory. Therefore, tamper resistant software does not have to run in the same address space or processor in which it was created. The software is generated by using a tamper resistant compiler (not shown). The tamper resistant compiler is a compiler that, when applied to a well prepared software module, replaces the plain-text source code compiler generated image with a new image that is obfuscated. This self-decrypting software will only execute properly if no part of the image has been altered from the time it was compiled by the tamper resistant compiler. The tamper resistant compiler is a software approach towards providing kernels of software with the ability to run in a "hidden" execution mode. Attempts to decipher what the software is actually doing, or modifications made to the software, will result in the complete failure of the kernels (i.e., it will not decrypt properly).

The tamper resistant module 14 includes an Integrity Verification Kernel (IVK). An IVK is software that verifies that a program image corresponds to a supplied digital signature. This provides a robust mechanism for detecting changes made to executing software, where those changes might be caused by transmission errors or malicious attacks to the software. Any change to the software results in a failure in the verification process. IVKs for tamper resistant software are constructed to perform self-checks of object code, bilateral authentication of partner modules, and checks on local and remote data to verify the integrity of a software module. The IVK is self-modifying, self-decrypting, and installation unique. Two interprocess software modules requiring to communicate with each other can establish that the module one is calling is indeed the one it is expecting by computing the digital signature of the called module and comparing the computed signature against a predetermined value. This process is called bilateral authentication. In the present invention, the IVK is used to verify the integrity of Process B. Detailed methods for creating the tamper resistant module and providing integrity verification processing with IVKs and bilateral authentication are disclosed in pending U.S. patent applications entitled "Tamper Resistant Methods and Apparatus", Ser. No. 08/662,679, and "Tamper Resistant Methods and Apparatus", Ser. No. 08/924,740, both of which are commonly assigned to the same entity as the present invention and are incorporated herein by reference.

The tamper resistant module 14 also contains a secret 16 which the tamper resistant module will not divulge until the integrity verification for Process B 12 is a success. The secret can be any arbitrary digital value selected by Process A. Process A 10 passes the tamper resistant module 14 containing the secret to Process B 12, along with a challenge 18. The tamper resistant module can be sent to Process B before the challenge, after the challenge, or simultaneously with the challenge. Process B then executes the tamper resistant module on its own system. The tamper resistant module is very difficult to examine or change while it is being executed. If the tamper resistant module runs properly and Process B's current image in memory is successfully verified according to the signed manifest of Process B's image 17, then Process B recovers the secret and uses the secret to encode the provided challenge to produce the appropriate response. Thus, response 20 includes an encrypted challenge E(challenge) 22. The response is sent back to Process A. Process A, already knowing the secret, decrypts the encrypted challenge. If the response is what Process A expects, then Process A knows that Process B is authentic and its integrity is intact. Further interaction between the parties can then commence.

The present invention is more effective if the secret 16 is a temporary, low value secret that is only used once. It is preferable that the secret is a nonce of no persistent worth. Therefore, Process A changes the secret for every challenge-response sequence. Additionally, a time out mechanism can be employed in Process A such that response 20 must be returned within a specified short time period. This deters a malicious user at Process B from intercepting the tamper resistant module and challenge and attempting to break the inherent security described herein, because the attack cannot be successfully carried out in the allotted time, if ever. Optionally, Process A can also request information from Process B as part of the challenge. The information is then encoded in response 20 back to Process A along with the challenge.

Figure 2:
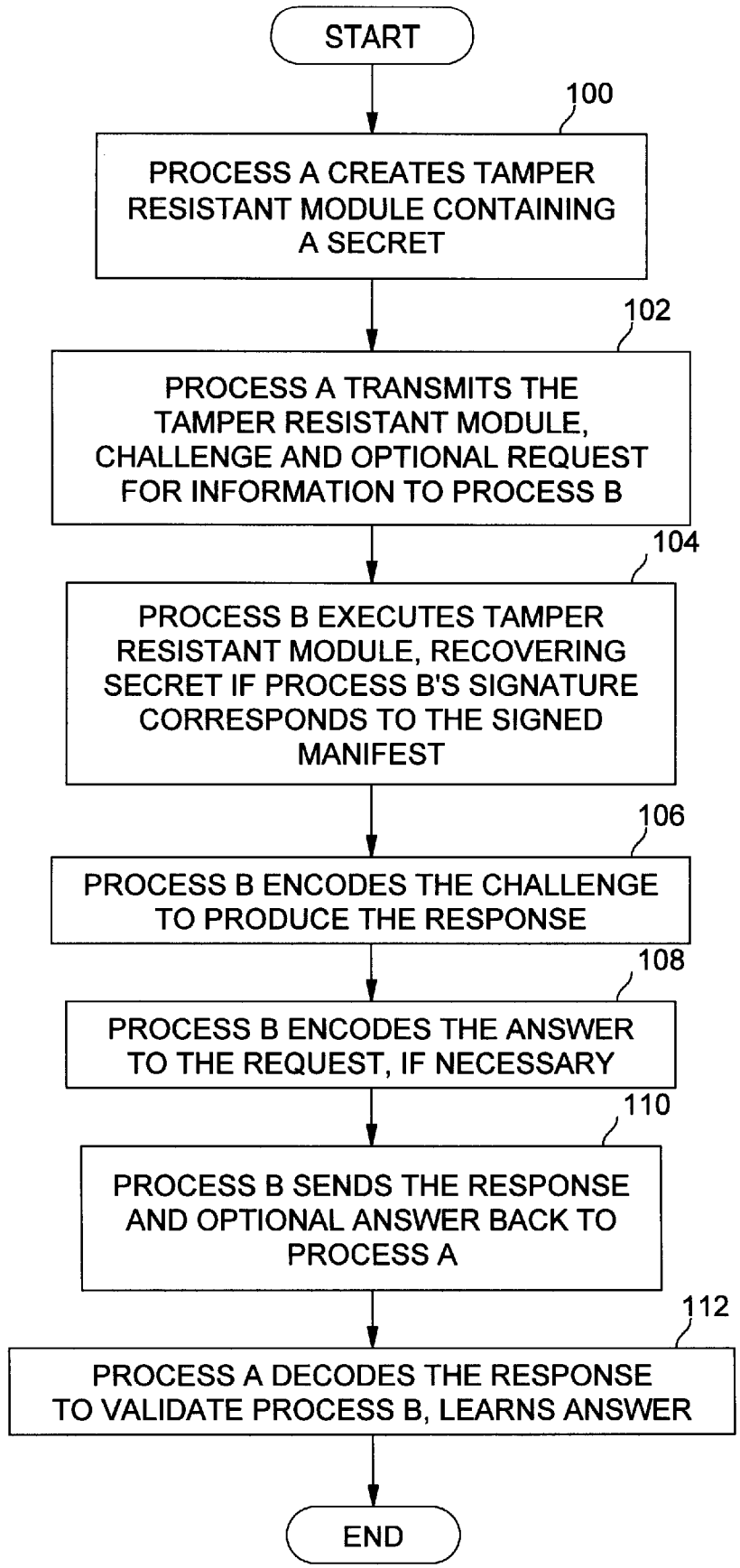
FIG. 2 is a flow diagram of the steps for authenticating another process according to the present invention.

FIG. 2 is a flow diagram of the steps for authenticating another process according to the present invention. At step 100, Process A creates a tamper resistant module containing a secret. The secret may be any arbitrary digital value known to Process A. Preferably it is a temporary, low-value secret such as a newly generated random number. At step 102, Process A transmits the tamper resistant module containing the secret, a challenge, and optionally, a request for information to Process B. Next, at step 104, Process B executes the tamper resistant module, thereby recovering the secret if Process B's digital signature computed by the executing tamper resistant module corresponds to a signed manifest for Process B's image. If the Process B's image failed to verify according to the signed manifest, then the tamper resistant module detects tampering or another error condition, and no further processing is performed by either Process A or Process B. Process A then assumes that Process B is not authentic or that a malicious user has attempted to "hack" the tamper resistant module. Otherwise, Process B encodes the challenge received from Process A to produce the response at step 106. The encoding operation includes performance of any suitable cryptographic algorithm using the secret as the key. At step 108, Process B encodes the answer to Process A's request for information, if necessary. Next, Process B sends the response and optional answer back to Process A at step 110. Finally, at step 112, Process A decodes the response to validate B and optionally, learns the answer to its information request. If the decoded response contains the challenge Process A sent to Process B, then Process B has been authenticated.

One skilled in the art can see that the present invention securely sends the secret as part of the tamper resistant validation process, and that the secret can be a nonce of no persistent worth. Furthermore, the secret was not required to be shared ahead of time by the communicating processes, and two asymmetric key pair components were not shared by the processes.

In the present invention, the party desiring authentication of a remote process sends an agent (i.e., the tamper resistant module) to the remote process to determine authenticity. This agent is constructed in such a way that it cannot be changed by a malicious user. One limitation, however, of the embodiment shown is that Process A must be able to construct a tamper resistant module that can be executed on Process B's operating system and processor. If the operating systems and underlying processors are the same (for example, WINDOWS NT or WINDOWS 95 operating systems available from Microsoft Corporation, Redmond, WA, and PENTIUM® or PENTIUM® II processors, available from Intel Corporation, Santa Clara, Calif.), then a tamper resistant module created by one party will be a valid executable on the other party's system.

The present invention could also be used in a bilateral manner, wherein Process A authenticates Process B and Process B also authenticates Process A. Both authentications are performed using the above described embodiment. That is, each process sends the other a tamper resistant module and challenge, and the receiving party must send back the correct response to the other party. Thus, each party trusts the other party for further communications.

Figure 3:
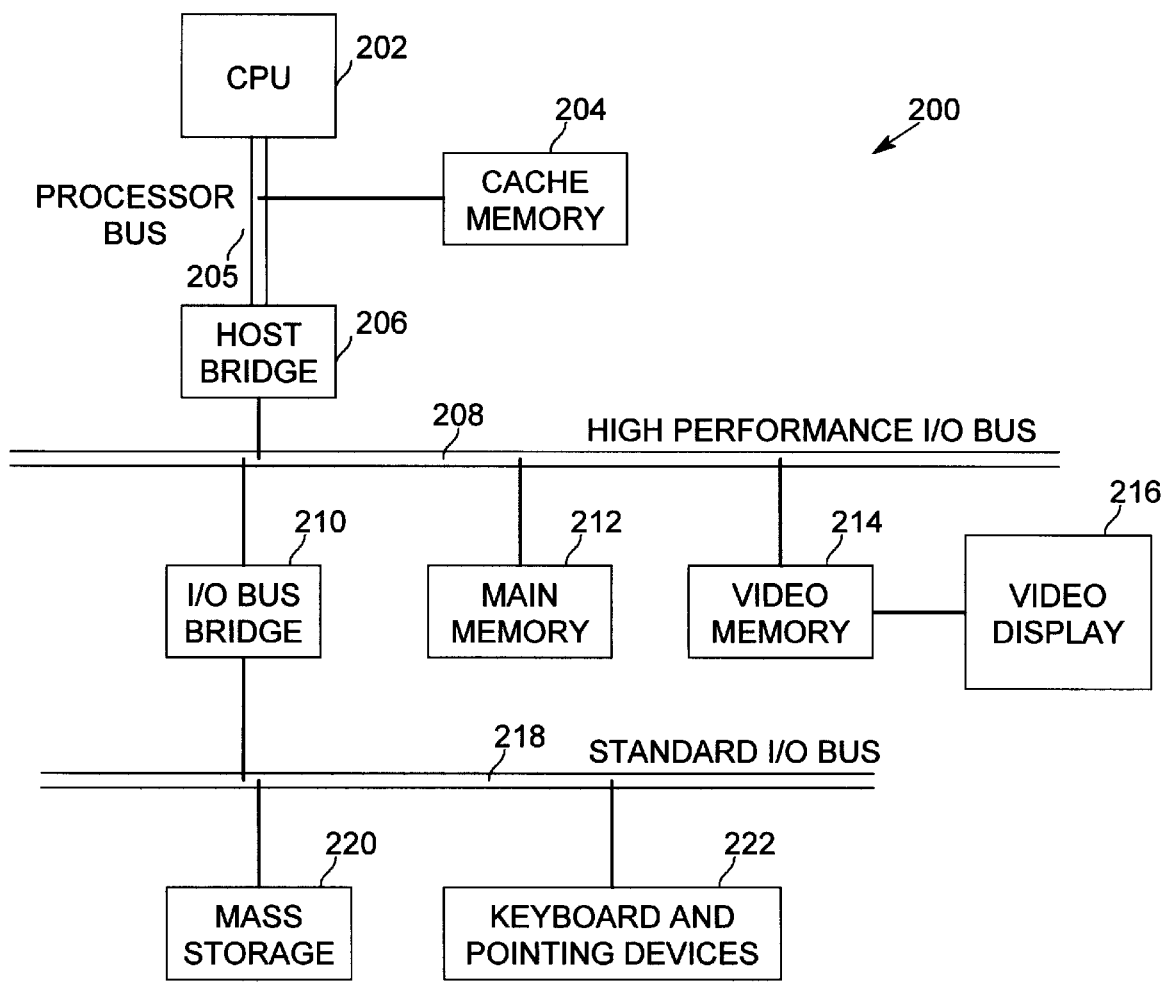
FIG. 3 illustrates a sample computer system suitable to be programmed with the authentication method in accordance with embodiments of the present invention.

FIG. 3 illustrates a sample computer system suitable to be programmed with the authentication method in accordance with embodiments of the present invention. Sample computer system 200 may be used to execute processing steps described above for Process A, Process B, or both. When Process A and Process B are on systems remote from each other, Process A is executing on a first sample computer system and Process B is executing on a second sample computer system connected to the first sample computer system via a network. Sample computer system 200 includes Central Processing Unit (CPU) 202 and cache memory 204 coupled to each other through processor bus 205. Sample computer system 200 also includes high performance I/O bus 208 and standard I/O bus 218. Processor bus 205 and high performance I/O bus 208 are bridged by host bridge 206, whereas high performance I/O bus 208 and standard I/O bus 218 are bridged by I/O bus bridge 210. Coupled to high performance I/O bus 208 are main memory 212 and video memory 214. Coupled to video memory 214 is video display 216. Coupled to standard I/O bus 218 are mass storage 220, and keyboard and pointing devices 222.

These elements perform their convention functions well known in the art. In particular, mass storage 220 is used to provide permanent storage for the executable instructions of the authentication and tamper resistant programs/applications, whereas main memory 212 is used to temporarily store the executable instructions of authentication and tamper resistant programs/applications during execution by CPU 202.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of authenticating a first process operating in an address space different than that of a second process comprising:
    creating, by the second process, a tamper resistant module containing a secret;
    sending the tamper resistant module and a challenge from the second process to the first process;
    executing the tamper resistant module by the first process and recovering the secret when the integrity of the first process is verified by the tamper resistant module;
    encoding the challenge using the secret to produce a response;
    sending the response to the second process; and
    decoding the response by the second process.

2. The method of claim 1, wherein the tamper resistant module comprises an integrity verification kernel to verify the integrity of the first process.

3. The method of claim 1, wherein the secret is used only once.

4. The method of claim 1, wherein the secret is a nonce of no persistent worth.

5. The method of claim 1, further comprising determining that the first process is not authentic when the response is not received within a predetermined period of time.

6. The method of claim 1, wherein the first process is verified by the module when a digital signature of the first process determined by the module corresponds to a signed manifest of the first process.

7. The method of claim 1, wherein the challenge comprises a request for information from the first process.

8. The method of claim 7, further comprising encoding an answer to the request for information in the response.

9. The method of claim 8, further comprising decoding the answer by the second process.

10. An apparatus for authenticating a first process operating in an address space different than that of a second process comprising:
    a processing unit for executing programming instructions; and
    a storage medium having stored therein a plurality of programming instructions of the second process to be executed by the processing unit, wherein when executed, the plurality of programming instructions create a tamper resistant module containing a secret, create a challenge, send the tamper resistant module and the challenge to the first process, receive a response to the challenge from the first process, and decode the response.

11. The apparatus of claim 10, wherein the tamper resistant module comprises an integrity verification kernel to verify the integrity of the first process.

12. The apparatus of claim 10, wherein the challenge comprises a request for information from the first process.

13. The apparatus of claim 10, wherein the secret is a nonce of no persistent worth.

14. An apparatus for authenticating a first process operating in an address space different than that of a second process comprising:
    a processing unit for executing programming instructions; and
    a storage medium having stored therein a plurality of programming instructions of the first process to be executed by the processing unit, wherein when executed, the plurality of programming instructions receive a tamper resistant module from the second process, initiate execution of the tamper resistant module, recover a secret embedded in the tamper resistant module when the integrity of the first process is verified during execution of the tamper resistant module, receive a challenge from the second process, encode the challenge using the secret to produce a response, and send the response to the second process.

15. The apparatus of claim 14, wherein the tamper resistant module comprises integrity verification kernel to verify the integrity of the first process.

16. The apparatus of claim 14, wherein the first process is verified when a digital signature of the first process determined by the module corresponds to a predetermined signed manifest of the first process.

17. The apparatus of claim 14, wherein the challenge comprises a request for information from the first process and the plurality of programming instructions further comprise encoding an answer to the request for information in the response.

18. An apparatus for authenticating a first process operating in an address space different than that of a second process comprising:
    a processing unit for executing programming instructions; and
    a storage medium having stored therein a plurality of programming instructions to be executed by the processing unit, wherein when executed, the plurality of programming instructions create a tamper resistant module containing a secret, create a challenge, send the tamper resistant module and the challenge to the first process, initiate execution of the tamper resistant module in the address space of the first process, recover the secret embedded in the tamper resistant module when the integrity of the first process is verified during execution of the tamper resistant module, receive the challenge from the second process, encode the challenge using the secret to produce a response, send the response to the second process, receive the response to the challenge from the first process, and decode the response.

19. An apparatus for bilateral authentication of local and remote processes comprising:

a processing unit for executing programming instructions; and a storage medium having stored therein a plurality of programming instructions of a local process to be executed by the processing unit, wherein when executed, the plurality of programming instructions create a first tamper resistant module containing a first secret, create a first challenge, send the first tamper resistant module and the first challenge to a remote process, receive a first response to the first challenge from the remote process, decode the first response, receive a second tamper resistant module, initiate execution of the second tamper resistant module, recover a second secret embedded in the second tamper resistant module when the integrity of the local process is verified during execution of the second tamper resistant module, receive a second challenge from the remote process, encode the second challenge using the second secret to produce a second response, and send the second response to the remote process.

20. A machine readable medium having stored therein a plurality of machine readable instructions designed to be executed by a processor, the machine readable instructions for creating a tamper resistant module containing a secret, creating a challenge, sending the tamper resistant module and the challenge to a remote process, receiving a response to the challenge from the remote process, and decoding the response.

21. A machine readable medium having stored therein a plurality of machine readable instructions designed to be executed by a processor, the machine readable instructions for receiving a tamper resistant module from a remote process, initiating execution of the tamper resistant module, recovering a secret embedded in the tamper resistant module when the integrity of a local process is verified during execution of the tamper resistant module, receiving a challenge from the remote process, encoding the challenge using the secret to produce a response, and sending the response to the remote process.

22. A machine readable medium having stored therein a plurality of machine readable instructions designed to be executed by a processor, the machine readable instructions for creating a tamper resistant module containing a secret, creating a challenge, sending the tamper resistant module and the challenge to a first process, initiating execution of the tamper resistant module in the address space of the first process, recovering the secret embedded in the tamper resistant module when the integrity of the first process is verified during execution of the tamper resistant module, receiving the challenge from a second process, encoding the challenge using the secret to produce a response, sending the response to the second process, receiving the response to the challenge from the first process, and decoding the response.

23. A machine readable medium having stored therein a plurality of machine readable instructions designed to be executed by a processor, the machine readable instructions for creating a first tamper resistant module containing a first secret, creating a first challenge, sending the first tamper resistant module and the first challenge to a remote process, receiving a first response to the first challenge from the remote process, decoding the first response, receiving a second tamper resistant module from the remote process, initiating execution of the second tamper resistant module, recovering a second secret embedded in the second tamper resistant module when the integrity of a local process is verified during execution of the second tamper resistant module, receiving a second challenge from the remote process, encoding the second challenge using the second secret to produce a second response, and sending the second response to the remote process.

* * * * *